United States Patent [19]
Clark

[11] Patent Number: 5,694,977
[45] Date of Patent: Dec. 9, 1997

[54] HIGH PRESSURE ENABLED, LOW PRESSURE ACTIVATED AUTOMATIC FLUID CONTROL VALVE

[75] Inventor: Robert H. Clark, Bristol, R.I.

[73] Assignee: The United States of America as represented by the Secretary of the Navy, Washington, D.C.

[21] Appl. No.: 528,631

[22] Filed: Sep. 5, 1995

[51] Int. Cl.$^6$ .................................... F16K 17/00
[52] U.S. Cl. ................. 137/467; 137/505.13; 137/517
[58] Field of Search ........................ 137/467, 463, 137/505.13, 517

[56] References Cited

U.S. PATENT DOCUMENTS

| | | | |
|---|---|---|---|
| 2,245,271 | 6/1941 | Guill | 137/517 |
| 2,927,603 | 3/1960 | Willis | 137/463 X |
| 3,698,424 | 10/1972 | Wiegand | 137/467 |
| 3,768,436 | 10/1973 | Martini | 116/124 B |

*Primary Examiner*—Stephen M. Hepperle
*Attorney, Agent, or Firm*—Michael J. McGowan; James M. Kasischke; Prithvi C. Lall

[57] ABSTRACT

A simple and highly reliable automatic valve is disclosed which is enabled by being subjected to a predetermined pressure and actuated as pressure is reduced from that pressure. A pressure differential of several orders of magnitude between enablement pressure and actuation pressure can be obtained by providing non-linear or plural springs which oppose fluid pressure against a reciprocable piston. The piston includes an aperture or passage which seals against a surrounding bore when the valve is closed. The piston is maintained in a position where the aperture or passage is sealed against the bore by a latch. The latch comprises a band spring held in position by a protrusion on the piston and released when the piston is moved by a predetermined fluid pressure. Fine adjustment of both enablement and actuation pressures is provided.

14 Claims, 3 Drawing Sheets

HIGH PRESSURE ENABLED, LOW PRESSURE ACTIVATED AUTOMATIC FLUID CONTROL VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention generally relates to automatic fluid control valves and, more particularly, to valves which are responsive to external or environmental fluid pressure for enablement of operation and actuation.

(2) Description of the Prior Art

The control of fluid flow is required in many fields of endeavor including chemical processes and safety arrangements therefor and control of buoyancy of ships and other water-borne vehicles. In many applications, it is necessary that valves function automatically in response to fluid pressures applied at the valve or elsewhere in the system. Requirements for automatically functioning valves generally carry a requirement for extremely high reliability or fail-safe operation while accommodating relatively complex functions.

For example, in chemical processes involving highly toxic or otherwise hazardous materials it may be desirable to respond to pressure fluctuations (e.g., transient overpressure) to divert fluid rapidly and with high reliability to a container or tank. The diversion of the material may then serve to prevent release of the material to the environment, possibly by a further chemical reaction in the container to neutralize the hazardous effects of the material. In such an application, insufficient time may be available for the operation of automatic controls or intervention by personnel and rapid and reliable response must be provided by the design of the valve.

In recent years, it has also been desirable to deploy water-borne, buoyant devices for numerous purposes such as accident marker buoys, navigational aids and radio transmitters or repeaters. It is also sometimes desirable for the deployed device to descend to substantial depths prior to ascending to the surface, for example, in order to place ground tackle at the bottom of the body of water to avoid drifting when the device is later floating on the water surface. This function is often achieved by counteracting the buoyancy of the device with jettisonable weights.

In any case, while the device is allowed to float to the surface, it is generally desired that overall positive buoyancy be as great as possible. Also, substantial differences in buoyancy, desirable, for example, for stabilizing the attitude of the flooded device over an elongated device can interfere with deployment apparatus and/or the trim of the vessel used for deployment of the device as well as reduce buoyancy during flotation. For this latter reason, it is considered desirable to provide a chamber in the device which can be flooded as the device nears the surface in order to achieve a desired differential buoyancy which will stabilize the attitude of the floating device while maintaining maximum buoyancy until the device is very close to the water surface. Likewise, it is often imperative that the flooding of such a chamber be reliably prevented prior to deployment. At the same time, the requirement for reliability of flooding such a chamber at a shallow depth is of paramount importance since failure to achieve the desired floatation attitude may preclude proper functioning of the device after deployment.

Numerous fluid pressure responsive arrangements have become known in the art in order to achieve various desired functions. For example, U.S. Pat. No. 3,768,436 to Martini and assigned to the assignee of the present invention uses a pressure sensitive spring latch which is released in response to high fluid pressure to allow the jettisoning of a spring-loaded cover over a dye reservoir on a practice torpedo when the fluid pressure thereafter becomes comparable to the pressure in the dye reservoir. This function permits release of dye close to the water surface to limit initial diffusion of the dye and increase visibility relative to, for example, a pressure-frangible dye reservoir which would permit substantial dye release and diffusion at a substantial depth below the surface. This mechanism is not suitable for a valve since it requires structure to be jettisoned and assumes a large pressure excursion for enablement and actuation, as would be encountered in a practice torpedo run.

Some relatively complex valves are also known which use the pressure of the controlled fluid to reduce actuation forces and to control leakage from the valve body after closure. An example of such a valve for hydrocarbon fuel dispensing is described in U.S. Pat. No. 5,337,797 to Janssen et al. However, automatic enablement and actuation is not provided.

Accordingly, there has been a long-felt need for a high-reliability valve for controlling fluid flow which reliably prevents flow when subjected to high pressure but will allow flow at low pressure after being subjected to a predetermined higher pressure; precisely the opposite function performed by well-known pressure relief devices. The differential of available pressures may be small or differ by several orders of magnitude in various applications while close adjustment of the pressures respectively required for enablement and actuation of the valve may also be desired for highly predictable performance. These characteristics have not yet been achieved in a practical, simple and highly reliable valve design.

SUMMARY OF THE INVENTION

It is therefore an object of the present invention to provide an automatic valve which is enabled at a predetermined and adjustable relatively high pressure while preventing flow and which is actuated to allow fluid flow therethrough when pressure is reduced to a predetermined level.

It is another object of the invention to provide an automatic valve which prevents high pressure flow but permits low pressure flow in which the relatively high enablement and relatively low actuation pressure are each individually configurable or adjustable from a small pressure differential to a pressure differential reaching several orders of magnitude.

In order to accomplish these and other objects of the invention, there is an automatic valve which is enabled by fluid pressure and actuated in response to reduction of pressure after being enabled, where the valve has a body portion having a bore therein, and a piston reciprocable within the bore. The piston has a piston face and at least one aperture sealable against the bore. One salient aspect of the invention is that the piston is maintained in a position where the aperture or passage is sealed against the bore by a releasable latch prior to application of a predetermined fluid pressure against the piston face. Further, in this valve arrangement, a bias arrangement or the like is disposed between the body portion and the piston for biasing movement of the piston within the bore in a direction to oppose movement of the piston by pressure of fluid against the piston face.

In one further aspect, the releasable latch involves an upstanding projection affixed to the piston face, and a band spring arranged to be held in a path of the piston by the upstanding projection until released by movement of the piston. This upstanding projection can be a pin extending from the piston face, and can be provided with adjustable height capability, if desired. Also, this pin can be provided in numerous ways such as interference fitted to the piston, or alternatively, it can be threadedly engaged to the piston or formed integrally with the piston.

In another further aspect, the aforesaid bias arrangement or the like is a spring means. An adjustable seat can be provided for the spring means. Also, the bias arrangement or the like can include a spring exhibiting a non-linear relationship of length and force applied thereto. In yet another embodiment of the bias arrangement, it is constituted by a primary spring, and a secondary spring. This organization of different springs permits the pressure differential between the enablement pressure and actuation pressure to be varied and increased at will. In this arrangement, this secondary spring can be of greater stiffness than the primary spring. Also, the primary spring can be of greater length than the secondary spring.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1A:
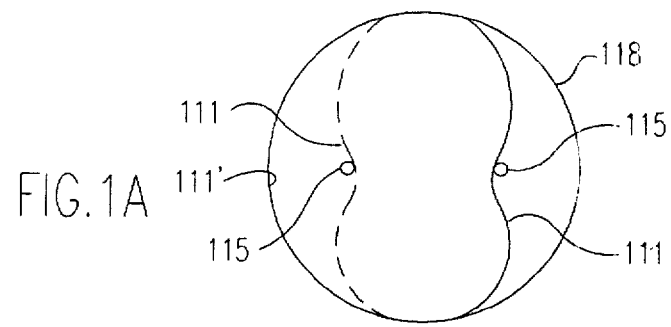
FIG. 1A is a sectional view of cavity 118 of the valve of FIG. 1, illustrating operation of band spring 111.
Figure 1:
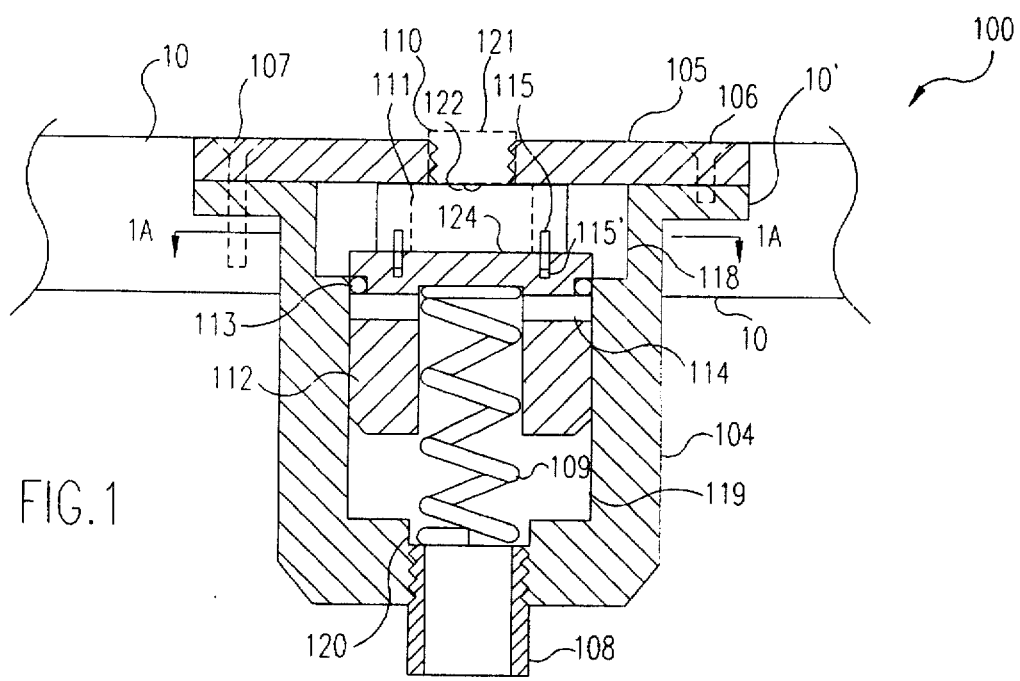
FIG. 1 is a partially cross-sectional view of a valve in accordance with the principles of the invention prior to enablement or actuation.

Referring now to the drawings, and more particularly to FIG. 1, there is shown, in cross-section, an automatic valve 100 in accordance with the principles of the invention. It is considered preferable to mount the valve flush with a surface or termination of a vessel or conduit 10 and for this purpose, a recess 10' is preferably provided therein. The major components of the valve exterior are a body 104 and cover 105; outer portions of which are preferably formed and secured together with, for example, screws 106 to provide a mounting flange. Other forms of attachment such as adhesives, soldering, brazing or welding may also be acceptable or provided in conjunction with the mounting of the valve, itself, such as with screws 107 which are sized to penetrate the flange and reach into the surface of vessel or conduit wall 10. However, it is to be understood that the particular mounting arrangement chosen is unimportant to the operation or practice of the invention.

The interior of body portion 104 is formed, preferably by machining, to provide two portions 118, 119 which have differing bores. The smaller of the bores 119 is sized to provide a tight clearance and slidable engagement with a piston 112, as will be described in greater detail below. The fit of piston 112 and bore 119 also serves to seal one or more apertures 114, extending from a lateral surface of piston 112 to the interior thereof, against fluid flow. The larger of the two bores 118 is sized to provide both a clearance for piston 112 within a band spring 111 and a fluid passage of adequate size to avoid undue constriction around the outside of the upper portion of piston 112, as will also be described in greater detail below. It is also to be understood, however, that, as long as the clearance and fluid passage are provided, the relative sizes of bores 118, 119 are otherwise unimportant to the practice of the invention, as are the absolute sizes of these bores, other than to accommodate the desired flow rates at anticipated pressures; the choice of which will be evident to those skilled in the art in light of this specification.

Other components of the valve in accordance with the principles of the invention include a spring 109, preferably in the form of a helical coil, but which may advantageously have either constant or variable pitch which regulates movement of piston 112 in response to fluid pressure applied to the upper surface or piston face 124 of piston 112. An adjustable hollow spring seat 108 preferably is provided in threaded engagement with body 104 in an aperture 120. There are also one or more enabling pins 115 attached to piston face 124, which are preferably adjustable and may be in threaded engagement or interference fit with a recess 115' in piston face 124 or formed integrally therewith if adjustment is not required. There also is an aperture 110 in the cover plate 105 permitting fluid flow into the valve, preferably arranged to be closed by a threaded plug (generally indicated by dashed lines 121) to avoid contamination or other deterioration of the valve prior to use. An O-ring seal 113 may optionally be provided between piston 112 and body 104 to improve sealing.

When the components of the valve 100 described above are in the relative positions shown in FIG. 1, the valve is neither actuated or enabled such that actuation is possible. That is, the valve is preferably assembled initially such that upward movement of piston 112 is limited by interference between band spring 111 and cover plate 105. As shown in FIG. 1A, this deformation of band spring 111 is maintained by one or more enabling pins 115. If not so restrained, the band spring 111 would revert to a circular shape having a diameter and circumference slightly smaller than bore 118 but larger than piston 112.

Specifically, piston 112 can be placed within bore 119 and band spring 111 placed within bore 118 and deformed beyond the shape indicated in FIG. 1A. Spring 109 may then be inserted through aperture 120 to urge the piston 112 with the enabling pin 115 installed thereon against the band spring 111. The band spring 111 can then be released against the enabling pin 115, as shown in FIG. 1A and the spring seat 108 installed. Cover plate 105 may then be installed to complete the valve. Thus, it is seen that assembly is simple and requires no tools or holding mechanisms and therefore is readily accomplished by hand. By the same token, the valve may be readily disassembled and reassembled, in whole or in part, for maintenance or resetting after use.

Figure 2:
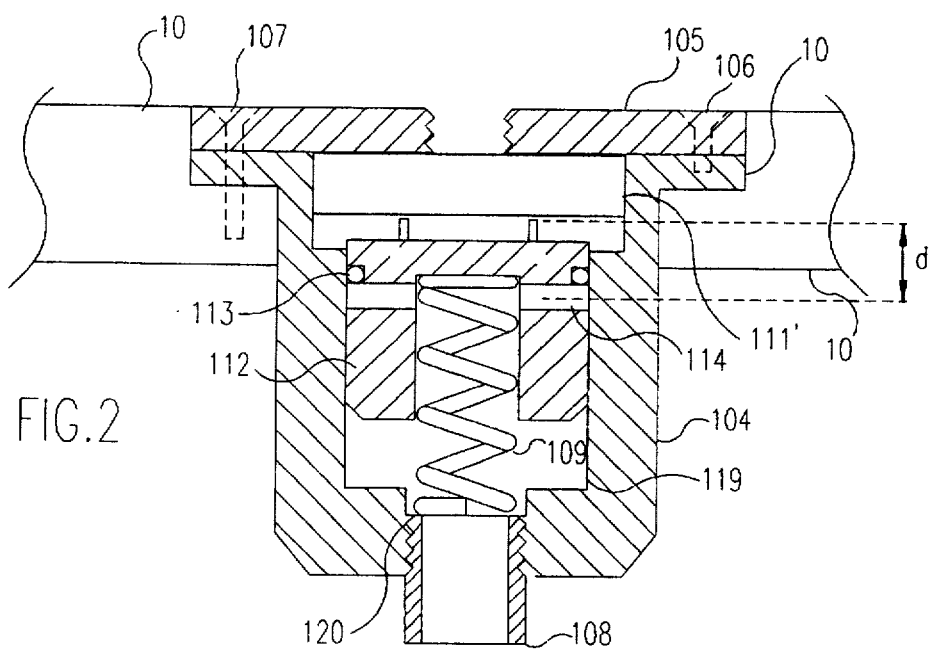
FIG. 2 is a cross-sectional view of the valve illustrated in FIG. 1 during enablement.

Referring now to FIG. 2, enablement of valve 100 by high pressure will now be explained. Initially, when the valve is to be used, aperture 110 must be opened by removal of any plug or cover which may be optionally employed in order to provide fluid communication from the outside (or "upstream" side) of the valve to piston 112. As fluid pressure is increased, piston 112 will be moved downwardly (in the orientation illustrated) while compressing spring 109. As the piston 112 moves in this fashion, enabling pin 115 will be moved across the exterior surface of band spring 111 until the end of enablement pin 115 reaches the edge of the band spring and the band spring is released to resume its circular shape near the perimeter of bore 118, as shown at 111'.

It should be noted that the cooperation of the enabling pin 115 with the moving piston 112 and band spring 111 thus provides a latch mechanism which is released by pressure. The pressure at which the latch will be released may be regulated or adjusted by adjustment of the protrusion of the enabling pin 115 from the piston 112, the amount by which an arbitrary increment of pressure will further compress (linearly or non-linearly) spring 109 (which is preferably placed under some degree of compression when the valve is assembled) and the position of valve seat 108. Thus, enabling pressure may be approximately chosen by the choice of spring 109 (e.g., by uncompressed length and spring constant at any given degree of compression) and fine adjustment made by adjusting the position of spring seat 108 and the amount of protrusion of enabling pin 115. It is contemplated that an initial coarse or approximate adjustment may be made with spring seat 108 and a final fine adjustment made immediately prior to deployment by adjustment of the amount of protrusion of enablement pin 115 from piston 112.

As an additional feature of the invention, it is also contemplated that aperture 110 can be sized and/or located relative to the enabling pin 115 (the location of which is not particularly critical) so that access is provided through aperture 110 for adjustment of protrusion of the enabling pin 115. For example, if enabling pin 115 is attached to piston 112 by an interference fit within a recess 115', pliers or a special purpose tool could be used to move enabling pin 115 within recess 115'. Alternatively, if the enabling pin 115 and recess 115' are threadedly coupled to each other, adjustment could be effected by turning of enabling pin 115 with a screwdriver or small wrench. In either case, it may be considered convenient to determine size or position of aperture 110 to provide convenience of access since neither position or size of aperture 110 will have any effect on the function or performance of the valve.

Figure 3:
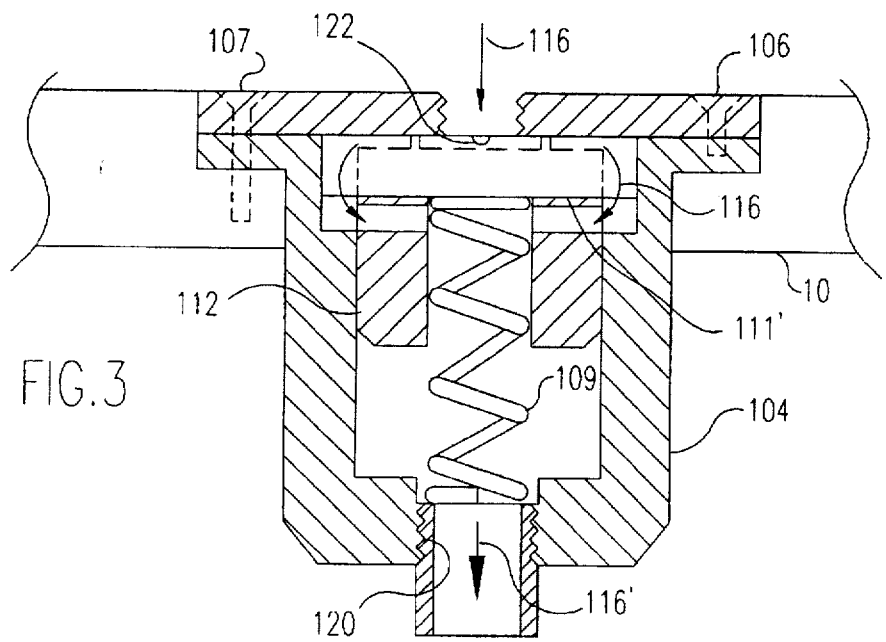
FIG. 3 is a cross-sectional view of the valve illustrated in FIG. 1 during actuation.

Once the valve is enabled, subsequent decrease of pressure will cause actuation of the valve, as will now be discussed with reference to FIG. 3. Specifically, as pressure on piston 112 from the exterior of the valve is reduced, spring 109 will cause upward motion of piston 112 since the oppositely-directed forces applied to the piston 112 by external fluid pressure and by spring 109 are always in substantial equilibrium (e.g., differing by no more than frictional forces between piston 112 and bore 119). However, since the band spring 111 has resumed its circular shape 111', movement of the piston 112 will not be constrained thereby. Thus, piston 112 is free to undergo a greater excursion of position until movement is limited by, for example, contact of enabling pin 115 with cover plate 105 which is arranged to expose apertures 114, in accordance with the principles of the invention. Thus a fluid flow path will be provided around the upper portion of the piston 112, through apertures 114 and the hollow portion of spring seat 108 as indicated by arrows 116, 116'.

Alternatively, if aperture 110 is positioned or sized to provide axial access to enabling pin 115 so that such contact is not possible, piston movement may be limited by other arrangements. For example, rib(s) or projection(s) 122 can be located on the bottom surface of cover plate 105 at a site(s) adjacent aperture 110 such that the projection(s) serve to stop upward movement of piston face 124 before it reaches the bottom major surface of cover plate 105 and seals off aperture 110. The particular arrangement is not important to the practice of the invention so long as piston 112 movement is not allowed to close aperture 110, unless, of course, it is desired that the valve be actuated to permit flow therethrough only for a particular range of pressures; the lower limit of which would be determined by spring 109 and the distance of travel of piston 112 between the exposure of apertures 114 and the seating of piston 112 across aperture 110.

In this regard, it should be understood that the differential of pressures between a pressure sufficient for enablement and a pressure at which the onset of flow through the valve will occur is governed by the "spring constant" of spring 109 over a range of distances of compression and the geometry of the valve itself, particularly the length "d" shown in FIG. 2. This length may be adjusted somewhat by adjustment of the protrusion of enablement pin 115, as described above. The effective "spring constant" (which, as noted above, may be slightly or substantially non-linear, depending on the geometry, structure and materials used for spring 109) may also be adjusted somewhat by adjustment of the location of spring seat 108. However, if a differential between enablement and actuation pressures exceeding approximately a factor of ten is required, it is expected that a length "d" which is proportionately greater that that illustrated would be required. The overall dimensions of the valve body 104 would also require a corresponding increase in length.

Figure 4:
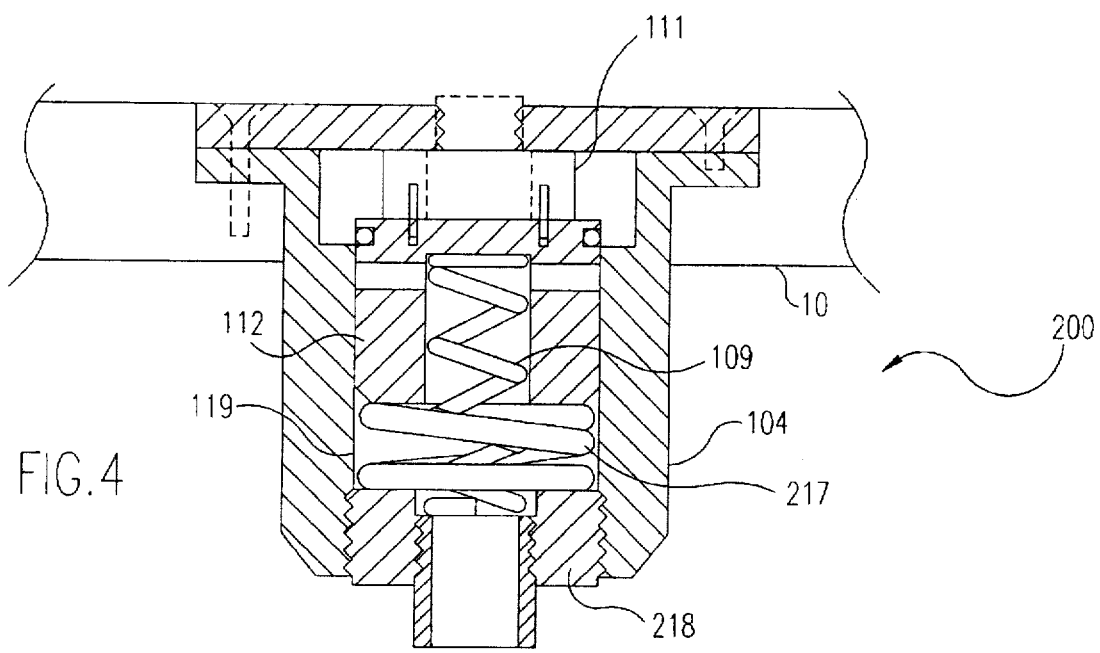
FIG. 4 is a cross-sectional view of a preferred embodiment of a valve in accordance with the invention prior to enablement or actuation.
Figure 5:
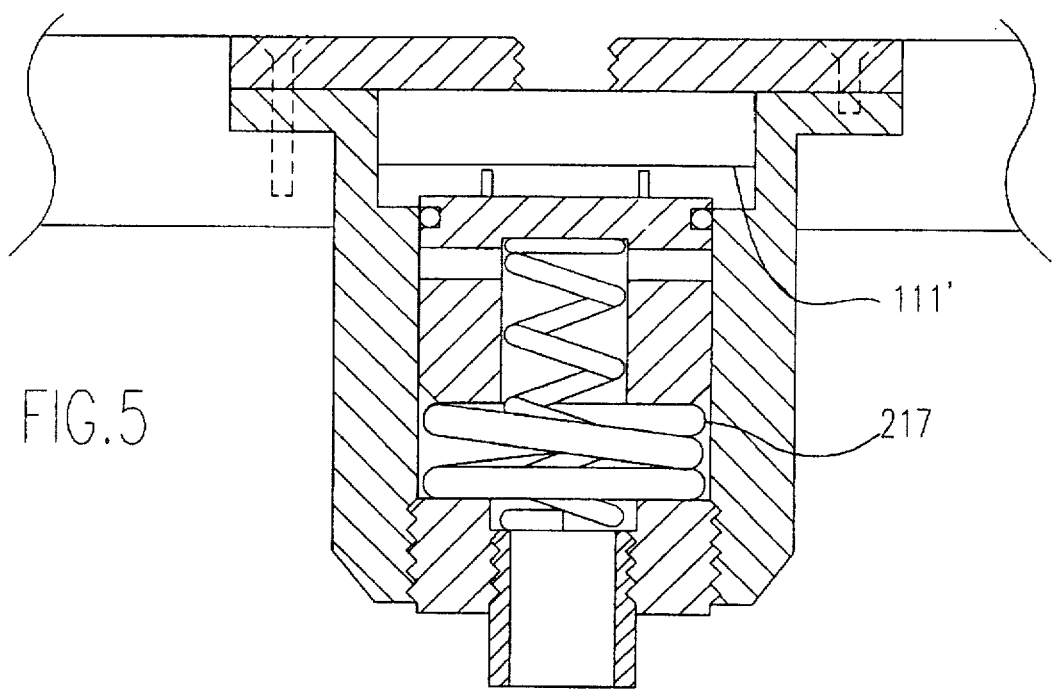
FIG. 5 is a cross-sectional view of the valve illustrated in FIG. 4 during enablement.
Figure 6:
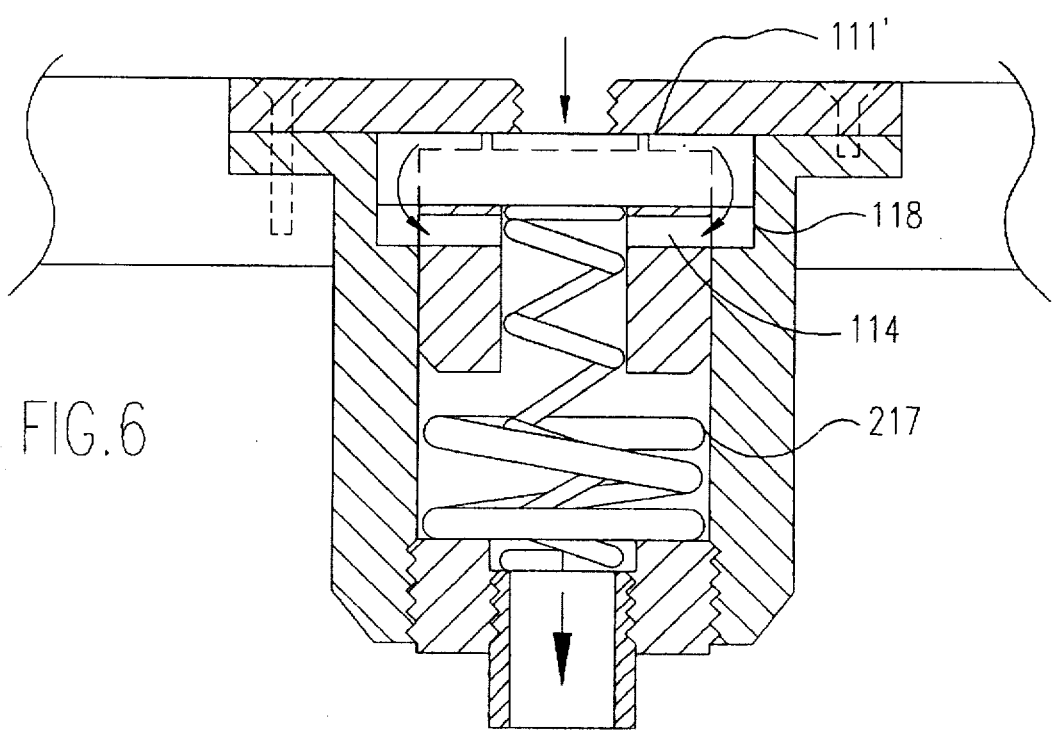
FIG. 6 is a cross-sectional view of the valve illustrated in FIG. 4 during actuation.

Referring now to FIGS. 4–6, an alternate embodiment 200 of the invention will be described in which the pressure differential between enablement pressure and actuation pressure can be varied and increased at will. This embodiment differs from that described above principally in the provision of a secondary spring 217 and, if desired, a secondary spring seat 218 therefor. Assembly of the valve 200 is substantially the same as described above with the exception that secondary spring 217 must be placed in bore 119 prior to the piston 112 if secondary seat 218 is not provided or not removable.

Secondary spring 217 is preferably of relatively short length, and compression prior to onset of enablement, if any, should generally be relatively small. Secondary spring 217 can optionally have a non-linear "spring constant", although provision of such is not believed to be necessary in most circumstances. Nevertheless, the greater the stiffness (e.g., the higher the "spring constant") relative to that of spring 109 the greater the differential that can be obtained between enablement and actuation pressures in a manner largely independent of length "d".

Specifically, FIG. 4 corresponds to the initial state of the valve 200 prior to enablement, similar to the illustration of FIG. 1. Since compression of spring 217, if any, is preferably small in this state, mechanical forces within the valve and adjustments thereof are similar to that of FIG. 1. It is preferred, therefore, that the length of spring 217 be determined in accordance with the distance between the bottom of piston 112 and the end of bore 119 when the top of piston 112 is seated against the deflected band spring 111 or that seat 218 be adjusted to similarly accommodate the length of spring 217. Free space or lost motion will have no effect on the overall function or operation of the valve 200 but a match of spring length to piston 112 and bore 119 is preferred to prevent looseness of parts which may cause noise, or wear or damage.

As pressure increases for enablement of the valve, downward motion of piston 112 causes pressure against both primary spring 109 and secondary spring 217. Therefore, particularly if spring 217 is of substantially greater stiffness than spring 109, even a relatively great increase in pressure will cause only small piston movement and enablement pressure may be made arbitrarily large. By the same token, since downward piston movement may be dominated by the stiffness of spring 217, the "spring constant" of spring 109 may be made of arbitrarily low significance to the enablement pressure for the valve. As shown in FIG. 5, enablement takes place in the same fashion as discussed above with reference to FIG. 2, releasing band spring 111 from enabling pin 115 after a predetermined piston 112 excursion, but with exterior fluid pressure on piston 112 acting primarily to compress spring 217 and only incidentally compressing spring 109 which is preferably of much reduced stiffness in comparison with the stiffness of spring 217.

As shown in FIG. 6, reduction of pressure causes upward motion of piston 112; initially due to forces exerted by both secondary spring 217 and primary spring 109. As before, this upward motion is not now constrained by band spring 111. However, it is preferred that spring 217 be fully uncompressed prior to exposure of aperture 114 in bore 118 whereupon the onset of fluid flow will occur. Thus, further upward motion of piston 112 will be entirely due to reduction of fluid pressure forces on piston 112 below the force exerted by spring 109, alone. Accordingly, the pressure at which valve 200 will be actuated may be made arbitrarily small and, in any case, independent of the enablement pressure.

In view of the foregoing, it is seen that the automatic valve in accordance with the invention provides a simple and reliable mechanism for establishing a fluid flow path at relatively low pressure only after being subjected to a relatively higher pressure. This mechanism can be fabricated and maintained at low cost due to the geometric simplicity and relatively small number of parts and the ease with which the valve can be assembled and disassembled. Further, by the adjustment or alteration of geometry of the valve parts and spring configuration or both, enablement and actuation pressures are individually and independently determinable with fine adjustment thereof being provided over a wide range of pressures and pressure differentials.

Thus, the valve in accordance with the invention is seen to be especially suitable for deployment of water borne vehicles and can be arranged, at will, to be enabled by pressures ordinarily encountered during deployment (e.g., hydrodynamic pressures) hydrostatic pressures exerted by the depth of water encountered during a desired path after release from a transporting vessel. High buoyancy can be maintained and flooding of ballasting containers for altering orientation and stabilizing floating attitude may be carried out arbitrarily close to the water surface.

While the invention has been described in terms of a single preferred embodiment, those skilled in the art will recognize that the invention can be practiced with modification within the spirit and scope of the appended claims. For example, different spring structures such as wave washers could be employed for either or both springs 109 and 217. Further, secondary/enablement spring 217 could be provided by a resilient cylinder of, for example, polymer or plastic material or even a rigid, frangible element such as a cylinder of glass of other brittle material with a circumferentially extending slot or other configuration which will concentrate forces at a predetermined location when the cylinder is placed in compression.

Likewise, other latch mechanisms may be employed although the enablement pin and band spring arrangement described above is believed to be optimal for most applications in view of its simplicity, low cost and reliability. For example, if the ability to reset the valve without disassembly is desired, a saw-tooth cam and rotating cam follower mechanism such as that employed in inexpensive ball-point pens could be arranged at the bottom of piston 112. A tool for depressing the piston 112 can be readily affixed to aperture 110 in such a variation of the invention. This and other suitable latch mechanisms will not compromise the fluid tightness of the closed valve if below the O-ring seal, if employed, or entirely within bore 118 (e.g., above the O-ring seal) or otherwise, so long as the sealing of apertures 114 against bore 119 is not adversely affected.

In light of the above, it is therefore understood that within the scope of the appended claims, the invention may be practiced otherwise than as specifically described.

What is claimed is:

1. An automatic valve which is enabled by fluid pressure and actuated in response to reduction of pressure after being enabled, said valve comprising:

a body portion having a bore therethrough from an outboard end to an inboard end;

a piston reciprocable within said bore, said piston having a piston face oriented toward said outboard end of said body portion, an axial cavity extending partially through said body portion and at least one transverse aperture sealable against said body portion bore and in communication with said axial cavity;

a bias means disposed between said body portion and said piston for biasing movement of said piston within said bore in a direction to oppose movement of said piston by pressure of fluid against said piston face; and a releasable latch for maintaining said piston in a position where said at least one transverse aperture is sealed against said bore prior to application of a predetermined fluid pressure against said piston face.

2. An automatic valve as recited in claim 1, wherein said body portion bore has a counterbore region at said outboard end of said body portion, and said releasable latch comprises:

an upstanding projection affixed to said piston face and extending toward said outboard end; and a band spring arranged to be held between said piston and said body portion outboard end by said upstanding projection until released by movement of said piston toward said body portion inboard end, said band spring expanding into said counterbore region upon release of said spring.

3. An automatic valve as recited in claim 2, wherein said upstanding projection comprises a pin extending from said piston face.

4. An automatic valve as recited in claim 3, wherein projection of said pin from said piston face is adjustable.

5. An automatic valve as recited in claim 1, wherein said bias means comprises a bias spring.

6. An automatic valve as recited in claim 5, further comprising an adjustable seat for said bias spring.

7. An automatic valve as recited in claim 1, wherein said bias means includes a non-linear bias spring exhibiting a non-linear relationship of length and force applied thereto.

8. An automatic valve as recited in claim 1, wherein said bias means includes:

a primary bias spring for resisting fluid pressure against said piston face prior to application of said predetermined fluid pressure against said piston face; and a secondary bias spring for resisting fluid pressure against said piston face and maintaining said transverse aperture in sealed relationship with said body portion until application of a second predetermined fluid pressure against said piston face.

9. An automatic valve as recited in claim 8, wherein said secondary bias spring is of greater stiffness than said primary bias spring.

10. An automatic valve as recited in claim 8, wherein said primary bias spring is of greater length than said secondary bias spring.

11. An automatic valve as recited in claim 10, wherein said secondary bias spring is of greater stiffness than said primary bias spring.

12. An automatic valve which is enabled by fluid pressure and actuated in response to reduction of pressure after being enabled, comprising:

a body portion having a first bore and second bore positioned in tandem therein between a first opening and a second opening, respectively, located at opposite ends of said body portion, said first bore having a smaller diameter than said second bore;

a cover plate defining an aperture therethrough being sealingly attached to said body portion at said second opening;

a piston reciprocable within said first bore, said piston having a piston face oriented towards said cover plate, an axial cavity in said piston oriented toward said first opening, and at least one transverse aperture sealable against said first bore and in communication with said axial cavity;

a helical spring disposed between said body portion and said piston for biasing movement of said piston within said first bore in a direction to oppose movement of said piston by pressure of fluid against said piston face;

at least one enabling projection joined to and extending from said piston face toward said cover plate; and a band spring having an exterior surface and an undeformed circular shape, said band spring being housed in said second bore and deformed in a non-circular shape by contact between said at least one enabling projection pin and said exterior surface, said band spring positioned in interference with said piston and said second bore limiting movement of said piston face toward said cover plate, said band spring being restored to a non-interfering circular shape in said second bore by movement of said piston toward said first opening until said enabling projection is removed from contact with said exterior surface of said band spring.

13. An automatic valve as recited in claim 12, further comprising a spring seat installed in said body portion first bore at said first opening, said helical spring being positioned between said spring seat and said piston and acting in compression to bias said piston toward said second opening.

14. An automatic valve as recited in claim 13, wherein said spring seat is positionable to vary the force required to move said piston.

* * * * *